United States Patent
Fritzberg

[15] 3,650,769
[45] Mar. 21, 1972

[54] VACUUM PUFFED FOODS

[72] Inventor: Edward L. Fritzberg, Minneapolis, Minn.
[73] Assignee: The Pillsbury Company, Minneapolis, Minn.
[22] Filed: Apr. 29, 1969
[21] Appl. No.: 820,309

[52] U.S. Cl................99/134, 99/28, 99/65, 99/71, 99/78, 99/83, 99/117, 99/124
[51] Int. Cl................A23g 3/00
[58] Field of Search............99/26, 71, 124, 134, 134 A, 99/138

[56] References Cited

UNITED STATES PATENTS

| | | | |
|---|---|---|---|
| 2,082,313 | 6/1937 | Todd | 99/138 |
| 3,020,164 | 2/1962 | Forkner | 99/134 |
| 1,434,667 | 11/1922 | Thompson | 99/138 |

Primary Examiner—Raymond N. Jones
Assistant Examiner—J. M. Hunter
Attorney—Ronald E. Lund, James V. Harmon and M. Paul Hendrickson

[57] ABSTRACT

To prevent destructive crystallization of vacuum puffed food products, a powdered edible filler is suspended in a matrix which consists of an aqueous solution of a saccharide. The filler can comprise any of a variety of powdered food substances such as flour, dried milk, cocoa, coffee or powdered vegetable solids which remain largely undissolved in the matrix. The dispersion is made up to a stiff taffy consistency, formed into sheets subdivided into pieces of a desired size, heated sufficiently to become soft and exposed to vacuum until expanded to at least two times their original size.

7 Claims, No Drawings

VACUUM PUFFED FOODS

The present invention relates to instantly soluble porous food products prepared by vacuum expansion and to improvements in the formulation tolerance of puffed food products.

The general objective of the invention is to provide a food product composed of friable porous pieces which will break up and dissolve quickly when placed in water and which have tender eating qualities, i.e., "melt in the mouth" when eaten and can be used either as a confection or as a salty snack. It has been known for some time that corn syrup prepared by acid treatment of starch can be used as an ingredient in puffed confections such as malted milk balls. The use of this syrup is, of course, limited to those foods which are compatible with the sweet taste of the syrup. They cannot, for instance, be used satisfactorily with nonsweet foods such as snacks, etc.

Moreover, puffed confections such as those referred to commonly as malted milk balls have a very low tolerance to formula changes. Thus, if the composition is varied to an appreciable extent, the dissolved sugar present in the composition will crystallize and either interfere with or totally prevent expansion when the vacuum is applied. Malted milk balls are normally prepared by dissolving a sugar in water and then cooking the composition until the syrup has thickened to the desired consistency. It is then beaten, formed into sheets, and expanded. As the product expands, moisture is exhausted in the vacuum chamber and the pieces become supersaturated. The sugar then crystallizes out of the solution. If crystallization occurs too soon in the process, the product will not expand fully. On the other hand, if the syrup does not harden, removal of the vacuum may cause the product to collapse. Significant changes in the formula will often prevent the product from puffing properly.

In view of these and other deficiencies of the prior art, it is one object of the present invention to provide an improved dry, friable, highly porous expanded food product.

A further object is the provision of a porous expanded food piece which will easily break up and quickly dissolve when placed in water or when eaten.

Another object of the present invention is the provision of an improved porous expanded food product of the type described which is characterized by having substantial formulation tolerance so that it will expand and later solidify even though the proportions of materials are varied considerably.

Still another object of the present invention is the provision of an improved porous, friable food product which is voluminous enough to quickly collapse and dissolve when added to a liquid thereby dispersing undissolved particles throughout the liquid.

Another object of the present invention is the provision of an improved porous friable food product of the type described which does not have a sweet taste and can, accordingly, be used as a salty snack with a meat or cheese flavor as well as dried soup and gravy mixes, or, for that matter, any other food product which is incompatible with sugar.

A further object of the present invention is the provision of an improved porous food product of the type described which can be readily produced using available equipment.

In accordance with the present invention and in contrast with the prior art, a matrix is prepared which is composed of an aqueous solution of a saccharide. To the matrix is added a filler composed of a finely divided edible food substance that remains undissolved in the matrix. The filler appears to absorb a substantial portion of the water present in the matrix and thereby convert the matrix to a stiff syrup having the consistency of taffy (but which at room temperature may be fairly brittle). The taffy-like material will hereinafter be referred to as a plastic mass.

The saccharide can be a monosaccharide, a disaccharide or polysaccharide or a mixture of several saccharides. It is, however, essential that the saccharide that is used be very soluble in water. By the term "very soluble" I mean that the saccharide should dissolve in an equal weight of water at room temperature. This will exclude certain of the relatively insoluble saccharides. It must, moreover, exhibit a decreasing viscosity with temperature so that the matrix can be made fluid by heating it. The saccharide must, in other words, be thermoplastic. A third requirement is that the saccharide or mixture can have an amorphous form when dry rather than an exclusively crystalline form. Among the monosaccharides that can be used are xylose, glucose, mannose, galactose and fructose. Disaccharides, such as maltose, can also be used but lactose is not soluble because of its low solubility. Sucrose is unsuitable because of its crystallinity. Among the polysaccharides that can be used are mixed polysaccharides, commonly referred to as dextrins. Dextrins are formed either by heat hydrolysis, acid hydrolysis or enzyme hydrolysis of starch. In general, any polysaccharide or mixture of polysaccharides which meets the solubility and viscosity characteristics mentioned above and which can be amorphous after being dried is suitable.

I was surprised to discover that dextrins produced excellent results by providing a matrix that allows puffing to occur and yet produces a light friable easily dissolved structure after being dried. At the same time, it adds little if any sweetening to the composition. Thus, unlike prior vacuum puffed products, a dextrin will perform admirably as a matrix for a vast variety of highly interesting and novel food products for which no sweetening is desired. Among these are soup, gravy and other food mixes as well as snacks, such as salty snacks having a meat, cheese or cereal flavor. These products have a highly unusual character in that unlike ordinary snacks, when placed in the mouth, they melt quickly like a confection which, as far as I have been able to determine, is unlike anything previously available.

When a dextrin is used, I prefer to use a mixture having a dextrose equivalent of between about 5 and 25 percent and a total mono, di and trisaccharide content below about 20 percent and preferably below 15% and the balance comprising tetrasaccharides or above. Such mixtures are produced by controlled acid hydrolysis of starch followed by repolymerization or by enzyme treatment. A typical mixture is composed of about equal parts of trisaccharides, tetrasaccharides and pentasaccharides, say about 7 percent each, greater amounts of hexa and heptasaccharides and about 46 percent of saccharides greater than octosaccharides. A typical product of the above type is sold under the trademark Liqui-Dex by Clinton Corn Products Company of Clinton, Iowa. If desired, the mixture can also contain a monosaccharide. For example, I have used a composition composed of 3 percent of a monosaccharide consisting of dextrose, 6 percent disaccharides, 8 percent trisaccharides, 7 percent tetrasaccharides, 7 percent pentasaccharides and 69 percent above hexasaccharides. This composition had a dextrose equivalent of between about 20 and 22 percent. A typical product of this kind is sold under the registered trademark Mor-Rex by Corn Products Company of 10 E. 56th, New York, New York.

The dextrose equivalent of the enzyme produced polysaccharide mixture can be even lower than 25%. For example, I have successfully used one polysaccharide mixture obtained by the enzyme treatment of starch having a final dextrose equivalent of between 10 and 13 percent. This product consists of about 1 percent dextrose, 4 percent disaccharides, 5 percent trisaccharides, 4 percent tetrasaccharides, 4 percent pentasaccharides, and 82 percent of hexasaccharides and above. Yet another mixture that can be employed is a mixed saccharide having a dextrose equivalent at between 16 and 20 percent and composed of about 1 percent dextrose, 7 percent of disaccharides, 9 percent trisaccharides, 6% tetrasaccharides, 6% pentasaccharides, and 71 percent hexasaccharides and above. Both of the last two mentioned products are sold under the trademark Mor-Rex by Corn Products Company. The mixed saccharide can comprise any mixed mono and polysaccharides derived from any source provided they have a dextrose equivalent between about 5 and 25 percent and a total mono, di, and trisaccharide content of less than about 20 percent by weight. When a polysaccharide mixture is used, those having only a trace of mono and disaccharides consisting almost entirely of trisaccharides and above are preferred because the finished product has less tendency to crystallize upon standing and has less sweet taste which is desirable when used with foods that do not have a sweet taste.

The saccharide is dissolved in water to provide a matrix. The amount of water in the saccharide should be from 4 to 40 percent by weight and preferably from 5 to 20 percent by weight of the final mix.

The particle size of the filler is not considered critical so long as there is a reasonably large surface area over which the moisture present in the matrix can be absorbed. The filler should, however, be in powdered form with most of the particles having a size of less than about 150 microns and preferably less than 40 microns in diameter.

The filler should be present in a sufficient amount to convert the matrix to a plastic condition as distinguished from a syrup. The term "plastic" as used herein means a thickened mass of taffy-like consistency which flows so slowly that the flow cannot be seen unless the material is observed over an extended period of time. Although I do not wish to be limited to the theoretical explanation for the success achieved in providing improved formulation tolerance, it appears that the filler absorbs a portion of the unbound water present thereby concentrating the saccharide solution to a point at which it will harden at room temperature without promoting crystal growth.

The amount of filler needed to produce a plastic condition will depend upon the composition of the filler. The amount of the filler may vary greatly, thus a small amount will produce some small benefit and a larger amount will produce an even greater effect. Thus, in one typical formula, about ten parts of filler are used for each 225 parts of matrix (of which 30 percent is water). In another formula, about 10 parts of filler are used for each 10 parts of matrix. Generally, the filler should comprise about 10 to 90 percent by weight of the solids present in the composition, and, in most instances, between 30 and 60 percent by weight of the solids present in the composition.

Among the fillers that can be used are the following materials in powdered form: starch, sucrose, milk solids, wheat flour, potato flour, cocoa, powdered soluble coffee or tea, dried fruit pulp, dried drink mix, dried vegetable pulp, cellulose, dried cheese, peanut butter, dried soup stock, spray dried tomato soup, dried bouillon, dried gravy mix, dried ice cream mix or any combination of these materials.

In addition to these products, I prefer to employ a minor amount of a hydrolyzed vegetable protein foaming agent such as hydrolyzed soy protein, for example, the product sold by the Gunther Company as D100. When used, it can comprise about 0.5 to 3.0 percent by weight of the total composition.

The process used for preparing products in accordance with the invention will now be described.

The saccharide, water, filler and a foaming agent, e.g., hydrolyzed vegetable protein, if used, are placed in a suitable mixing vessel and mixed vigorously until converted to a plastic mass. The mass will have a taffy-like appearance and can be observed to flow only if viewed over a substantial period of time. The plastic mass is then subdivided into pieces of the desired size by molding, extrusion or sheeting followed by cutting, breaking or by any other suitable method. The pieces can be of any size but are typically about one-fourth inch in diameter.

The mass is then heated sufficiently to render it elastic. By "elastic" I mean capable of expanding freely when subjected to vacuum. A further reason for heating is to provide enough latent heat to vaporize sufficient moisture to produce the amount of vapor required to effect the desired expansion and to reduce the moisture content of the matrix to the point where it ceases to be fluid at the elevated temperature. For most purposes, a temperature of about 120° to 200° F. and preferably between 150° and 180° F. is sufficient to render the plastic mass elastic. In the event the material tends to overpuff and thereby collapse after being subjected to vacuum due to too high a moisture content or if the oven temperature is too high, rendering the matrix too fluid, it is desirable, at least initially, to increase the vacuum slowly and steadily so that expansion will take place at a controlled rate. The vacuum is finally increased until a vacuum in the range of 25 to 29 inches of water. The final vacuum should not be low enough to cause uncontrolled bubbling nor should it decrease during the puffing operation. The pieces are puffed to at least two times their original size.

The vacuum is maintained until the product is dry enough to be self-supporting. This usually occurs in about 10 minutes, but I prefer to allow the product to remain in the vacuum chamber for about 30 minutes.

The invention will be better understood by reference to the following examples.

EXAMPLE I

A raspberry flavored confection is prepared as follows: 300 grams of corn syrup (43° B.) is pinched in a Hobart mixing bowl and heated to 160° F. to reduce its viscosity and thereby facilitate subsequent mixing. The corn syrup contains approximately 20 percent water by weight. To this is added 150 grams of powdered gelatinized starch and 9 ml. flavor and color. The product is mixed on medium speed for a period of 10 minutes until the starch is uniformly distributed through the corn syrup. As the mixing continues, a plastic mass is formed which has the consistency of a very stiff taffy. The mass removed from the mixer, is then sheeted, scored and broken into pieces of the desired size after cooling and hardening. The pieces are placed on trays and heated to about 150° F. This causes the pieces to become elastic. The trays are then quickly transferred to a vacuum chamber and subjected to a steady vacuum in the range of 25 to 29 inches of water for a period of 30 minutes. The pieces each puff to about 3 times their original size. The vacuum is then released and the products are removed.

EXAMPLE II

A puffed products is prepared as in Example I except that corn syrup is replaced by a solution of maltose.

EXAMPLE III

Products are prepared as in Example I except that starch is replaced with wheat flour.

EXAMPLE IV

The product is prepared as in Example I except that starch and flavoring is replaced with 146 grams of nonfat dry milk solids, 54 grams of powdered cheese, and 50 grams of gelatinized starch.

EXAMPLE V

Another puffed product is prepared as in Example I except that starch and flavoring is replaced with 300 grams of powdered sucrose and 80 grams of a mixture consisting of maltose 30 percent, wheat flour 30 percent, and a minor amount of baking soda.

EXAMPLE VI

Another puffed product is made as in Example I except that starch and flavoring is replaced with the same amount of ground wheat bran.

EXAMPLE VII

A product is made as in Example I except that starch and flavoring is replaced with powdered wheat germ.

EXAMPLE VIII

A fruit drink puff for addition to a glass of water to make a fruit drink is mixed as described in Example I. The formulation is as follows:

| | |
|---|---|
| corn syrup 43° B. 42% extrose equivalent | 300 grams |
| sucrose finely ground | 300 grams |
| fruit flavor and color | 10 grams |

EXAMPLE IX

An instant coffee puff to be added to hot water for making a cup of coffee is mixed as in Example I. It had the following formulation:

| | |
|---|---|
| mixed saccharide[1] 15% dextrose equivalent | 300 grams |
| instant coffee (powdered | 300 grams |

The plastic material is divided into pieces heated to 160° F. and puffed in a vacuum of 28.5 inches of water.

EXAMPLE X

A cocoa puff to be added to hot water for making a cup of cocoa is mixed as in Example I. The composition is:

| | |
|---|---|
| corn syrup 43° B. 42% dextrose equivalent | 245 grams |
| cocoa powder | 91 grams |
| sucrose | 70 grams |
| powdered nonfat dry milk | 120 grams |

EXAMPLE XI

A beef bouillon puff for preparing soup by addition to hot water is mixed as in Example I. It is composed of the following materials:

| | |
|---|---|
| mixed saccharide[1] 18-20% dextrose equivalent | 213 grams |
| dried beef bouillon powder | 10 grams |
| water | 87 grams |

Footnote 1. dextrose 1%, disaccharides 2%, trisaccharides 6%, tetrasaccharides 6%, pentasaccharides 6%, hexasaccharides and above 23%

The mixture was blended at medium speed for a period of about 10 minutes at a temperature high enough to fluidize the syrup. At the end of this time, the mass had become plastic. The plastic mass was formed into sheets, cooled to a consistency at which it could be handled and divided into pieces. The pieces were then placed in a vacuum drier with water at a temperature of 150° F. circulating through the heating plates and allowed to become elastic before a vacuum of 29 inches was applied. After one-half hour of sustained vacuum, the pieces were puffed into round balls. They were completely dried and removed.

EXAMPLE XII

Another batch was made as in Example XI in which the following materials were used:

| | |
|---|---|
| cheese powder | 300 grams |
| water | 87 grams |
| a mixed polysaccharide[2] | 213 grams |

The manufacturing procedure was the same as in Example XI.

EXAMPLE XIII

Tomato soup puffs to be used for making a cup of tomato soup by addition to water was prepared as in Example XII except that cheese powder was replaced with 300 grams of spray dried tomato soup powder.

The product was a voluminous puffed ball which, when dropped into hot water, dispersed quickly to form a soup.

EXAMPLE XIV

A chicken gravy puff was prepared as described in Example XII except that the powdered cheese was replaced with a dried chicken gravy.

Footnote 2. monosaccharides (dextrose) trace, disaccharides as maltose trace, trisaccharides 7%, tetrasaccharides 7%, pentasaccharides 6%, hexasaccharides 16%, heptasaccharides 14%, octasaccharides 4%, and higher saccharides 46%

I claim:
1. A method for preparing a puffed food product comprising providing a matrix composed of a solution in water of a highly soluble dextrin composed of a mixture of saccharides having a dextrose equivalent of between about 5 and 25 percent and a total mono, di, and trisaccharide content of less than about 20 percent by weight, and having an amorphous form when dried, said dextrin being thermoplastic when heated, admixing a sufficient amount of an edible filler composed of material which remains predominantly undissolved to absorb a portion of the water to thereby convert the dissolved dextrin to a plastic state when mixed, mixing the aforesaid materials until the edible filler is dispersed in the matrix, providing sufficient heat to maintain the resulting composition in an elastic condition and thereafter subjecting the composition to vacuum of at least 15 inches of water until the food product is dry enough to be self-supporting to thereby puff the composition to at least two times its original size.

2. The process of claim 1 wherein the matrix is heated before the filler is added thereto to facilitate the dispersion of the filler.

3. The process of claim 1 wherein a minor amount of a foaming agent comprising a hydrolyzed vegetable protein is incorporated in the composition to facilitate puffing.

4. The process according to claim 1 wherein a snack flavor is incorporated in the composition.

5. The process according to claim 1 wherein the filler is dried cheese whereby a cheese flavor is incorporated in the composition.

6. The process according to claim 1 wherein the filler is dried gravy powder whereby a gravy flavor is incorporated in the composition.

7. The process according to claim 1 wherein the filler is dried soup.

* * * * *